US 6,538,170 B2

United States Patent
Kato et al.

(10) Patent No.: US 6,538,170 B2
(45) Date of Patent: Mar. 25, 2003

(54) POLLUTED SOIL REMEDIATION APPARATUS, POLLUTED SOIL REMEDIATION METHOD, POLLUTANT DEGRADING APPARATUS AND POLLUTANT DEGRADING METHOD

(75) Inventors: Kinya Kato, Atsugi (JP); Masahiro Kawaguchi, Atsugi (JP); Akira Kuriyama, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/794,836

(22) Filed: Feb. 28, 2001

(65) Prior Publication Data

US 2001/0023852 A1 Sep. 27, 2001

(30) Foreign Application Priority Data

Feb. 29, 2000 (JP) .......................... 2000-054318
Nov. 22, 2000 (JP) .......................... 2000-355788

(51) Int. Cl.[7] .................. A62D 3/00; B01D 53/00; C07B 63/00; G01V 5/00
(52) U.S. Cl. ................. 588/212; 588/213; 588/209; 588/210; 588/227; 588/228; 204/157.3; 204/158.2; 204/158.4; 250/253
(58) Field of Search ............... 588/17, 209, 210, 588/212, 213, 227, 228; 204/157.3, 158.2, 158.4; 250/253

(56) References Cited

U.S. PATENT DOCUMENTS 6,132,561 A * 10/2000 Mincher et al. ....... 204/157.15
6,238,628 B1   5/2001 Matsutani ............... 422/172

FOREIGN PATENT DOCUMENTS

JP  9-299753   11/1997
JP  10-180040   7/1998

OTHER PUBLICATIONS

G. Huybrechts et al., "Gas–Phase Chlorine–Photosynthesized Oxidation of Trichloroethylene," 62 *Trans. Faraday Soc.* 2191–2199 (1962). Month unavailable.

K.L. Müller et al., "Die Phtochemische Durch Chlor Sensibilisierte Oxydation von Trichloräthylen zu Dichloracetylchlorid," B37 *H.Z. Phys. Chem.* 365–373 (1937) (With English Translation). Month unavailable.

* cited by examiner

*Primary Examiner*—Edna Wong
(74) *Attorney, Agent, or Firm*—Fitzpatrick, Cella, Harper & Scinto

(57) ABSTRACT

A polluted soil remediation apparatus comprising a treatment tank in which pollutants degradable with light irradiation in the presence of chlorine is extracted as a gas containing the pollutants from polluted soil and a mixture of the gas containing the pollutants and chlorine-containing air is irradiated with light to degrade the pollutants, wherein the apparatus comprises a unit for aspirating the gas containing the pollutants from the polluted soil, a chlorine-containing air generation unit for generating the chlorine-containing gas, a mixing unit for mixing the gas containing the pollutants extracted by the aspiration unit and the chorine-containing air generated by the chlorine-containing gas generation unit to form a mixed gas.

49 Claims, 7 Drawing Sheets

POLLUTED SOIL REMEDIATION APPARATUS, POLLUTED SOIL REMEDIATION METHOD, POLLUTANT DEGRADING APPARATUS AND POLLUTANT DEGRADING METHOD

BACKGROUND OF THE INVENTION

1. Field of the Invention

The present invention relates to an apparatus for remedying polluted soil material and polluted soil and an efficient method of remedying polluted soil material and polluted soil using the same. The present invention relates to a polluted gas-purifying apparatus and a method of purifying the same, too.

2. Related Background Art

Recently, as measures to solve environmental pollution problems, various attempts have been made to remove pollutants from soil polluted with organic substances or the like to remedy soil, and for example, a method in which pollutants in soil are aspirated using a vacuum pump and treated with activated carbon, bioremediation utilizing degradation activities of microorganisms, a method for decomposing a pollutant by irradiating the soil with UV have been proposed.

The vacuum aspiration method cannot always be said an efficient method, since pollutants are removed by adsorption to activated carbon which has insufficient efficiency, it is difficult to treat materials having a large water content, and retreatment of used activated carbon that has adsorbed pollutants is a problem.

As for the bioremediation, the expression of degradation activities and the proliferation process of microorganisms are not always stable and degradation process management is sometimes relatively difficult. Thus, the bioremediation has rarely been in the actual use to cope with soil pollution, especially with organic chlorinated compounds.

An apparatus for degrading a pollutant by means of light is known, which is a photodegradation apparatus utilizing a phenomenon that ultraviolet of UV-B, C degrades some kinds of pollutants. Japanese Patent Application Laid-Open Nos. 09-299753 and 10-180040 disclose such apparatus.

SUMMARY OF THE INVENTION

It is an object of the present invention to provide an apparatus that can efficiently treat polluted soil using chlorine-containing water, excluding the necessity of treatment with activated carbon or microorganisms and without a risk of secondary pollution, and an efficient method of remedying polluted soil using the apparatus. It is also an object of the present invention to provide a summary polluted gas-purifying apparatus and a purifying method using the apparatus.

A remediation apparatus of the present invention to achieve the above described object is a polluted soil remediation apparatus comprising a treatment tank in which a pollutant degradable with light irradiation in the presence of chlorine is extracted as a gas containing the pollutant from a polluted soil and a mixed gas of the gas containing the pollutant and a chlorine-containing gas is irradiated with light to degrade the pollutant, wherein the apparatus comprises:

an aspirating means of aspirating the gas containing the pollutant from the polluted soil;

a chlorine-containing gas generation means of generating the chlorine-containing gas;

a mixing means of mixing the gas containing the pollutant extracted by the aspirating means and the chorine-containing gas generated by the chlorine-containing gas generation means to form the mixed gas;

a treatment region where the mixed gas is introduced; and a light irradiation means of irradiating the treatment region with light to degrade the pollutant contained in the mixed gas; and an exhaust means of exhausting a degradation-treated gas from the treatment region of the treatment tank.

A combination of a pit provided in the polluted soil and a vacuum pump for aspirating the gas containing the pollutant through the pit can be used suitably as the aspirating means in the polluted soil remediation apparatus.

Means bringing a functional water, which is capable of generating an air containing chlorine by being aired, into contact with air as well as a chlorine cylinder can be used suitably as the means of generating the chlorine-containing gas. Concretely speaking, a means of sending air to a surface of the functional water, a means of bringing small droplets of the functional water into contact with air, e.g. a nozzle as a means of ejecting the functional water, and a means of aerating the functional water with air can be suitably used.

Means comprised of a water tank, a means of generating the functional water, a means of introducing air into the water tank, a means of discharging the generated chlorine-containing gas and a means of discharging the functional water after being used for the generation of the chlorine-containing gas can be also suitably used as the means of generating the choline-containing gas.

The method of remedying polluted soil of the present invention is a polluted soil remediation method wherein a pollutant degradable with light irradiation in the presence of chlorine is extracted as a gas containing the pollutant from a polluted soil and a mixed gas of the gas containing the pollutant and a chlorine-containing gas is irradiated with light to degrade the pollutant, which comprises the steps of:

aspirating the gas containing the pollutant from the polluted soil;

introducing the chlorine-containing gas;

mixing the gas containing the pollutant and the chlorine-containing gas to form the mixed gas;

irradiating the mixed gas introduced in a treatment region of a treatment tank with light to degrade the pollutant contained in the mixed gas; and exhausting the degradation-treated mixed gas from the treatment region.

For the step of aspirating the pollutant-containing gas from a polluted soil, it is preferable to use the pit formed in the polluted soil and the vacuum pump for aspirating the pollutant-containing gas through the pit.

It is suitably used in the method of introducing the chlorine-containing air to bring the functional water into contact with air as well as a chlorine cylinder. Concretely speaking, a step of sending air to a surface of the functional water, a step of bring small droplets of the functional water into contact with air, e.g. a step of ejecting the functional water by a nozzle, and a step of aerating the functional water with air can be suitably used.

The step of generating the chlorine-containing air may comprise the steps of: generating chlorine-containing water; supplying the chlorine-containing water to a water tank; introducing air to the water tank; exhausting the generated chlorine-containing air; and draining the chlorine-containing water used for generation of the chlorine-containing air.

The step of generating the chlorine-containing water to be supplied to the water tank may comprise the steps of:

supplying electrolyte-containing water to the water tank; and
applying a potential to the electrolyte-containing water in
the water tank.

According to the present invention, for example, first, air
containing pollutants in a shaft is aspirated by a vacuum
pump or the like. Then, chlorine-containing water is exposed
to air to generate chlorine-containing air. The chlorine-
containing air is mixed with the air containing the pollutants
in a treatment tank and a mixture is irradiated with light. The
pollutants are degraded by light irradiation, and then a liquid
component and air are discharged. Thus, organic compo-
nents such as trichloroethylene, which has become an issue
as a harmful substance, can be efficiently extracted from soil
and treated for degradation.

According to still another aspect of the present invention,
there is provided a pollutant degrading apparatus comprising
a bag-shaped treatment tank a shape and a capacity of which
are variable, in which tank a mixed gas of a gas containing
a pollutant degradable with light irradiation in the presence
of chlorine and a chlorine-containing gas is irradiated with
light to degrade the pollutant, wherein the apparatus com-
prises:

a chlorine-containing gas generation means of generating
chlorine in a gas;

a mixing means of mixing the gas containing the pollutant
and the chorine-containing gas generated by the
chlorine-containing gas generation means to form the
mixed gas;

a treatment region where the mixed gas is introduced;
a light irradiation means of irradiating the treatment region
with light to degrade the pollutant contained in the mixed
gas; and an exhaust means of exhausting the degradation-treated
gas from the treatment region of the treatment tank.

According to a further aspect of the present invention,
there is provided a pollutant-degrading method in which a
mixed gas of a gas containing a pollutant degradable with
light irradiation in the presence of chlorine and a chlorine-
containing gas is irradiated with light to degrade the
pollutant, which comprises the steps of:

introducing the chlorine-containing gas;

mixing the gas containing the pollutant and the chlorine-
containing gas to form the mixed gas;

irradiating the mixed gas introduced in a treatment region
of a bag-shaped treatment tank a shape and a capacity
of which are variable with light to degrade the pollutant
contained in the mixed gas; and exhausting the degradation-treated mixed gas from the
treatment region.

For the bag-shaped treatment tank a shape and a capacity
of which are variable used in the above-mentioned present
inventions, it is preferable to have an accordion-fold struc-
ture. Further, it is preferable to have a case covering the
bag-shaped treatment tank. It is more preferable to locate the
light irradiation means in a region inside the case and outside
the bag-shaped treatment tank.

It is preferable that the gas containing said pollutant to be
treated is at least one selected from the group consisting of
a polluted exhaust gas, a polluted gas desorbed from an
activated carbon and a polluted gas originating from an
aeration of a polluted water as well as a gas aspirated from
a polluted soil.

According to the polluted soil remediation method using
the polluted soil remediation apparatus, polluted soil can be
efficiently treated on site without the necessity of treatment
with activated carbon, a problem of secondary pollution, or
the necessity of activity control management resulted from
the use of microorganisms. Excavated soil can also be
cleaned.

It is possible to utilize a tank the shape and capacity of
which are variable as the treatment tank for the present
invention. Such a tank brings about the following advanta-
geous effects:

(1) saving cost of the apparatus,
(2) facilitating the installation of the apparatus and improv-
ing the mobility/removability thereof because of the light
weight of the tank,
(3) facilitating the folding of the tank because of the
accordion-fold structure, and
(4) altering easily the size of the tank according to the
degrading condition because of the accordion-fold struc-
ture and bag shape of the tank, whereby the retention time
(reaction time) can be optimized in accordance with the
situation.

Further the bag-shaped treatment tank regarding the
present invention can be applied to the degrading treatments
of a polluted exhaust gas, a polluted gas desorbed from an
activated carbon and a polluted gas originating from an
aeration of a polluted water as well as a gas aspirated from
a polluted soil.

DETAILED DESCRIPTION OF THE
PREFERRED EMBODIMENTS

A fundamental constitution of an embodiment of the
degrading apparatus of the present is explained below.
[Degrading Reaction]
(Constitution of Apparatus)

Figure 1:
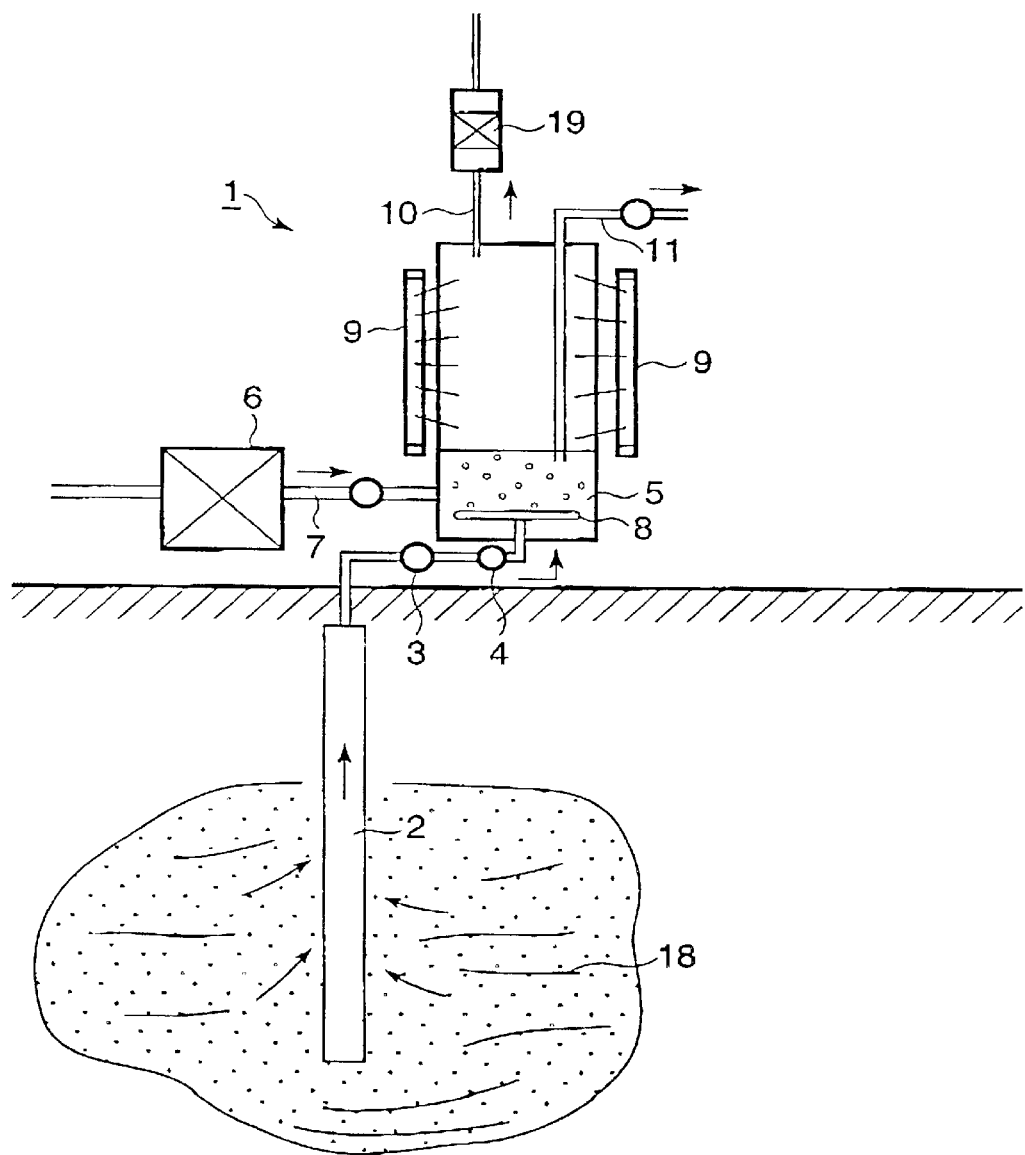
FIG. 1 is a schematic view of a polluted soil remediation
apparatus according to one embodiment of the present
invention.

FIG. 1 is a schematic view of a polluted soil remediation
apparatus 1 according to one embodiment of the present
invention. On a wall surrounding an opening of a shaft 2 of
the polluted soil remediation apparatus 1 of this
embodiment, a vacuum pump 3 is provided as aspiration
means for aspirating air in the shaft 2. The vacuum pump 3
is connected through a blower 4 to a lower part of a
treatment tank 5 for degrading pollutants. Air obtained from
soil aspirated by the vacuum pump 3 is blown from the
lower part of the treatment tank 5 into the treatment tank 5
by the blower 4. Although this gas is usually air containing
volatile pollutants, the gas may be mainly composed of
pollutants.

An apparatus generating chlorine-containing water 6 supplies the chlorine-containing water to the treatment tank 5 via the pipe 7.

The polluted air sent by the blower 4 is supplied into the treatment tank from the gas supply inlet 8. The polluted air is jetted as bubbles into the chlorine-containing water, and a chlorine gas and the pollutants are released to a gas phase part of the treatment tank. Light irradiation measures 9 irradiates a mixture of the pollutants and the chlorine gas with light, for example, a black light. A tube 10 exhausts the polluted air that has been cleaned. The cleaned polluted air exhausted from the tube 10 may be released as it is, if the concentrations of the pollutants are not higher than a predetermined level, and may be released to an activated carbon adsorption tower like 19. A tube 11 drains the chlorine-containing water that has been used for the treatment. The tube 11 is preferably made of material passing light, and irradiation of light degrades the pollutants dissolved in the chlorine-containing water.

As one example of a pollutant extraction apparatus using the vacuum pump 3, a known double-vacuum extraction apparatus can be used. A horizontal well or the like can be used in addition to a shaft. Beside forming a well for vacuum extraction or the like in polluted soil to remedy the polluted soil in situ, it is possible to excavate polluted soil, aspirate pollutants from the polluted soil material through a pipe or the like, and degrade the pollutants to clean and remedy excavated polluted soil material as shown in Examples below.

In the apparatus shown in FIG. 1, the chlorine-containing air generation means is the one in which chlorine-containing water (functional water) is stored in a bottom part of the treatment tank and which comprises aeration means for passing air to the chlorine-containing water, and the air to be passed to the chlorine-containing water contain pollutants and the aeration means also serves as mixing means mixing the chlorine-containing air and the pollutants.

Although a gas (air) containing the pollutants is introduced into the chlorine-containing water to generate chlorine-containing air in the apparatus shown in FIG. 1, it is possible to use chlorine-containing air obtained by contacting air with chlorine-containing water, mix the chlorine-containing air with a gas containing pollutants in a closed region, and introduce the mixture to a treatment region where light irradiation is performed in the treatment tank. The contact of air with the chlorine-containing water may be conducted by aeration to the chlorine-containing water or introducing air (sending air) to a gas phase contacting a water surface.

In the chlorine-containing air generation means in which air is introduced to the gas phase part, water is supplied and drained using a pump so as to maintain a predetermined level of chlorine-containing water in the closed container. The gas phase part in the closed container is provided with air inlet and outlet. As air is supplied from the inlet, the chlorine-containing gas in the gas phase part in the container is forced out from the outlet. It can also be configured to use the chlorine-containing air generated from the chlorine-containing water for degradation. In this configuration, the gas containing the pollutants may be used as air and also serves as the mixing means mixing chlorine-containing air and the gas containing the pollutants.

(Degrading Process and Compound to be Degraded)

The polluted soil remediation method of the present invention will be described in detail. Recently, pollution with recalcitrant compounds to degradation, especially organic chlorides such as trichloroethylene has become more serious year by year, and establishment of efficient and simple treatment methods has been desired. The treatment method using the polluted soil remediation apparatus 1 of the present invention is effective in treating, in especially, organic chlorinated compounds such as trichloroethylene (TCE), tetrachloroethylene (PCE), 1,1,1-trichloroethane, cis-1,2-dichloroethylene, trans-1,2-dichloroethylene, chloroethylene, 1,1-dichloroethylene, dichloromethane and trichloromethane.

(As to Chlorine-Containing Water or Functional Water)

The chlorine-containing water which can be employed in the present invention has properties of a hydrogen ion exponent (pH) of 1 to 4 and preferably 2 to 3, and a dissolved chlorine concentration of 5 to 300 mg/l and preferably 5 to 150 mg/l and more preferably 30 to 120 mg/l. When using a platinum electrode as a working electrode and a silver-silver chloride electrode as a reference electrode, the oxidation-reduction potential in the range of not less than 800 mV to not more than 1500 mV can be suitably used. More circumstantially speaking, when the chlorine-containing air generation means stores the chlorine-containing water (, i.e. the functional water) with a bottom of the treatment tank, air passing through the water with the aid of a gas-providing means contains a pollutant, and the gas-providing means also functions as the mixing means of mixing a gas containing a pollutant and a chlorine-containing gas as shown in FIG. 1, it is desirable that the dissolved chlorine concentration is in the range described above.

By dissolving an electrolyte such as sodium chloride and potassium chloride in original water and electrolyzing the resulting solution in a cistern equipped with a pair of electrodes, the chlorine-containing water having such a property as described above can be obtained at the anode side.

With respect to the concentration of the electrolyte in the solution before electrolyzed, it is preferably 20 to 2000 mg/l and more preferably 200 to 1000 mg/l in case of sodium chloride as the electrolyte.

When a diaphragm is placed between a pair of electrodes, mixing of acidic water generated in the vicinity of the anode with alkaline water generated in the vicinity of the cathode can be prevented. An ion-exchange diaphragm or the like, for example, can be suitably used as the diaphragm. As means for obtaining such water, commercially available electrolyzed water generator (for example, Oasys Bio Half (trade name) of Asahi Glass Engineering Co., Ltd., and Electrolyzed Water Generator (Model FW-200, trade name) of Amano Corporation can be utilized.

This water solution is so called "electrolyte water", "electrolysis functional water" or "functional water", and used for bacteria-removing.

It is also possible to prepare the chlorine-containing solution having the above properties, i.e. the functional water, from a reagent by using hypochlorites such as sodium hypochlorite. For example, 0.001 to 0.1 mol/l of hydrochloric acid, 0.005 to 0.02 mol/l of sodium chloride, and 0.0001 to 0.01 mol/l of sodium hypochlorite enable the solution being prepared.

It is also possible to prepare a functional water at the dissolved chlorine concentration of 2 to 2000 mg/l and pH 4.0 or less from hydrochloric acid and a hypochlorite. For example, 0.001 to 0.1 mol/l of hydrochloric acid, and 0.0001 to 0.01 mol/l of sodium hypochlorite enable the functional water being prepared.

Other inorganic acids and organic acids can be used instead of hydrochloric acid in the above cases. The inorganic acid can be, for example, hydrofluoric acid, sulfuric acid, phosphoric acid or boric acid. The organic acid can be, for example, acetic acid, formic acid, malic acid, citric acid or oxalic acid. Further, the functional water can be prepared from $N_3C_3O_3NaCl_2$, which is commercially available as a powder material of weakly acidic electrolytic water, for example, Kynohsan 21X (tradename, manufactured by Clean Chemical Co.).

Chlorine-containing water generated using an apparatus provided with no diaphragm can be also used for above described degradation of organic chlorinated compounds. Such water is, for example, water having an oxidation-reduction potential not lower than 300 mV and not higher than 1,100 mV, a chlorine concentration not lower than 2 mg/l and not higher than 100 mg/l, and pH of 4 to 10.

Water having pH not lower than 4 can also be prepared not only by electrolysis but also by dissolving various reagents in raw water. For example, hydrochloric acid, sodium chloride, and sodium hypochlorite are contained in water at concentrations of 0.001 mol/l to 0.1 mol/l, 0.001 mol/l to 0.1 mol/l, and 0.0001 mol/l to 0.1 mol/l, respectively, to obtain desired chlorine-containing water.

On the other hand, desired chorine-containing water of the chlorine concentration of 3000 mg/l or less and pH not lower than 4 can be obtained using only a hypochlorite, for example, sodium hypochlorite at 0.0001 mol/l to 0.1 mol/l.

The above is an embodiment as shown in FIG. 1 representatively that the chlorine-containing air generation means stores the chlorine-containing water (i.e. the functional water) with a bottom of the treatment tank, air passing through the water with the aid of a gas-providing means contains a pollutant, and the gas-providing means also functions as the mixing means of mixing a gas containing a pollutant and a chlorine-containing gas.

As described later, in the degrading reaction in the present invention, it is desirable that the concentration of chlorine is made to amount to a value of a certain range in the degrading step. If such a range can be established, then it is not necessary for the present invention to make the dissolved chlorine concentration amount to a volume in the range numerically exemplified above.

Figure 3:
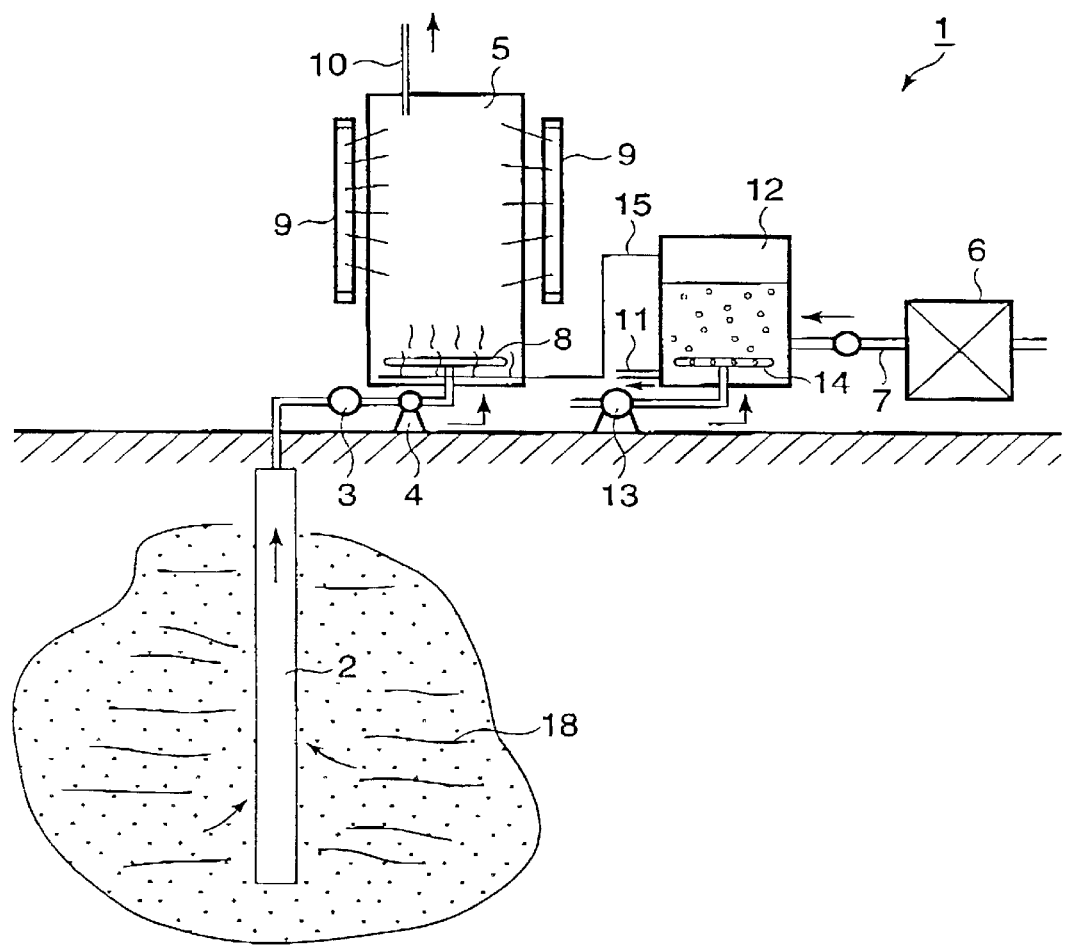
FIG. 3 is a schematic view of a polluted soil remediation
apparatus according to another embodiment of the present
invention.

For example, in case introducing a gas which does not include a pollutant into a chlorine-containing water as shown in FIG. 3 regarding Example 3 and mixing the resulting chlorine-containing gas and a pollutant-containing gas, it is desirable to make the chlorine concentration amount to the range numerically exemplified above. This is because the generated chlorine gas is diluted with the air containing the pollutant in such a constitution as shown in FIG. 3. The dilution ratio depends on a proportion regarding supplied amounts of the generated chlorine gas and the pollutant-containing air to the reaction region. For example, if the supplied amount of the pollutant-containing air is four times that of the generated chlorine gas, then it means that the chlorine gas is diluted with the pollutant-containing air at a volume ratio of 1 to 4. It is necessary to hold the concentration of chlorine in the resulting diluted gas in a certain range. In this purpose, it is desirable to heighten the concentration of dissolved chlorine in such an embodiment as in FIG. 3. more than that in the other ones.

In preparing such a functional water (chlorine-containing water) having a greater concentration of dissolved chlorine, it is easier to do it from any reagent than through electrolysis. The former method can provide the functional water having the concentration of dissolved chlorine ten to fifty times that of the functional water obtained through electrolysis. Although it might be disputable that whether the chlorine-containing water having such a high concentration of dissolved chlorine can be called the "functional water", such a chlorine-containing water is also called the "functional water" in this specification. When preparing such a functional water having the greater concentration of dissolved chlorine, it is preferable to mix hydrochloric acid and a sodium hypochlorite solution in a tank for generating chlorine rather than to premix reagents.

Tap water, river water, sea water and so forth can be used as the original water for preparing the functional water. These waters have a pH in a range of 6 to 8 normally and a chlorine concentration of less than 1 mg/l in maximum, and therefore does not have such a property of degrading organic chlorine compounds as described above, naturally.

(Concentration of Chlorine Gas and Means of Generating the Chlorine Gas)

It is possible to generate chlorine gas necessary for the degradation from all the above-described chlorine solutions, i.e. functional waters. An air containing chlorine available from an air passing through the functional water can be also used to degrade a pollutant by mixing the resulting air and the gas to be degraded and irradiating the mixed gas with light.

It is also possible for obtaining the mixed gas of a gas to be degraded and chlorine gas to pass through the functional water an air containing a pollutant instead of an air. The chlorine-containing gas having a relatively high concentration of chlorine can be obtained in this case.

A mixing ratio between the gas subjected to degradation and the chlorine-containing gas is preferably adjusted to make a chlorine gas concentration in the gas not lower than 5 ppm and not higher than 1,000 ppm. Especially when a chlorine gas concentration in the mixed gas is between 20 ppm and 500 ppm, further between 80 ppm and 300 ppm, the efficiency of degradation of the gas subjected to degradation is especially remarkable, although it depends on the concentration of the gas subjected to degradation.

Besides the electrolysis or the preparation of reagents as mentioned above, a chlorine cylinder, cartridge and so forth can be used to prepare and provide directly such a chlorine-containing gas having a desired concentration as mentioned above in a manner of diluting content gas of the cylinder etc. In short, selecting one optimum method according to a situation from those capable of realizing the above-mentioned range of chlorine gas concentration will satisfy.

(Means of Airing a Functional Water)

A bubbler, which functions as an air diffuser, can be used to passing a gas containing the pollutant and/or an air for aeration through the functional water. Although any conventional device for sending gas into liquid can be employed as such an air diffuser, it is desirable that the device is capable of generating bubbles with a sufficient surface area to allow chlorine in the liquid to vaporize into the bubbles.

The bubbler is preferably made from a material unreactive to ingredients of the functional water. A porous plate made of porous ceramics, sintered glass, sintered stainless steel SUS 316 or a net of SUS 316 wire; a sparger comprised of glass or a pipe of SUS 316 etc.; and so forth also can be used as a material of the bubbler.

(Main Reaction Area for the Degrading Step)

In one embodiment of the present invention, air is passed through the functional water to generate air containing chlorine gas necessary for the degradation. The portion for passing air through the functional water functions basically as a portion for providing chlorine gas necessary for the degradation. A gas phase reaction in a tank in which a treatment following the step of passing air through the functional water and the degrading reaction are conducted is a main stage of the degrading reaction.

Accordingly, when the step of generating chlorine is one with the degrading reaction, the ratio of the gaseous phase portion and the liquid phase portion influences the degrading efficiency. That is, if a volume of the functional water is increased, a permissible amount of chlorine is increased while the gaseous phase portion is decreased so that the degrading reaction area is decreased. If the volume of the gaseous phase portion is increased, the degrading reaction area is increased and therefore the degrading reaction rapidly progresses while the supplied chlorine decreases since the liquid phase portion is decreased.

Although there is various factors such as the aeration rate, the rate of supplying the functional water for considering the degrading reaction, if the region for preparing the air containing chlorine is one with the region of degrading reaction (also referred to as "treatment region"), the ratio of the liquid phase portion to the treatment rank is preferably 5 to 30%, more preferably 10 to 20%. Even if both regions are not one with each other, the ratio of the capacity of the tank wherein the air containing chlorine is generated to the capacity of the tank wherein the degrading reaction is carried out is preferably about 1:2 to 1:9.

As the light-irradiating means used for the present invention, the range of light is preferably 300 to 500 nm, and more preferably 350 to 450 nm. With respect to an intensity of light with which a pollutant to be degraded and chlorine gas are irradiated, in case of a light source having a peak in a vicinity of 360 nm wavelength, the intensity of several $\mu W/cm^2$ as a value evaluated in a range of 300 to 400 nm enables the substantially sufficient degradation to progress.

As the above light source, natural light such as sunlight, or artificial light such as mercury lamp, black light, color fluorescent lamp and light-emitting diode emitting light at short wavelength of 500 nm or less can be used.

Although the water containing chlorine used for the treatment may be irradiated with light when the water is discharged as shown in FIG. 1, it is preferable that light having the above-mentioned wavelength, intensity and being radiated from the above-mentioned light source is employed as the light in this case (Reaction Treatment Tank)

Although any shape is permissible as a unit providing physically the treating region in which the degrading treatment is carried out, a property of transmitting light of 300 nm or less wavelength is not necessary for such a unit because the degrading reaction in the present invention progress under light not including 300 nm or less. Accordingly, glass, plastics and so forth can be used as a material of the unit, which realizes saving cost of the system.

Such a large choice of the material makes possible to increase the flexibility of the choice of shape of the reaction tank. For example, a bag-shaped tank such as an air-bag can be used as the reaction tank, as described below in Examples 6 and 7 in detail.

Any bag having any shape can be selected as the reaction tank, provided the bag can transmit light of 300 nm and more, or 350 nm and more, which light is needed for the degradation. In particular, a bag made from TEDLAR (trademark, provided by Du Pont), which is comprised of polyvinylfluoride film, and a bag comprised of fluorine contained resin are suitable in view of the adsorbability of the gas and the ability of passing through the bag regarding the gas. Some of the fluorine contained resin bags can transmit light of 300 nm or less. Accordingly, the bag-shaped treatment tank in the present invention can be used to reactions in which the light of the wavelength is essential.

The employment of the bag-shaped tank enables the apparatus not only to save costs but also to be low in weight, thereby facilitating the installation of the apparatus and improving the mobility toward and away from a destination.

Further, the accordion-fold structure of the bag-shaped tank facilitates the folding of the tank.

In addition, the size of the tank is easily altered according to the degrading condition because of the accordion-fold structure and bag shape of the tank, whereby the retention time (reaction time) can be optimized in accordance with the situation.

Further the bag-shaped treatment tank regarding the present invention can be applied to the degrading treatments of a polluted exhaust gas from a chemical plant etc., a polluted gas desorbed from an activated carbon and a polluted gas originating from an aeration of a polluted water as well as a gas aspirated from a polluted soil.

(Degrading Reaction Mechanism)

While the inventors of the present invention has already found that the irradiation with light in the presence of chlorine gas progresses the degradation of organic chlorine compounds, many parts of the reaction mechanism thereof have not been unraveled. However, it has been already known that chlorine is dissociated when irradiated with light of a specific wavelength range to generate the radical. Also, in the degradation reaction mechanism of the present invention, it seems that chlorine radicals are generated by the light irradiation and then the generated radicals react with pollutant to break a chemical bond that exists in the pollutant.

Although oxygen is indispensable for the reaction of the present invention, the normal existence of oxygen in atmosphere or oxygen radicals generated by the decomposition of oxygen and chlorine is sufficient to the present invention.

EXAMPLES

The present invention will be described in more detail.

Example 1

A polluted soil remediation apparatus of the present invention will be illustrated in detail.

The effect of the polluted soil remediation apparatus of the present invention shown in FIG. 1 was confirmed at a field site polluted with TCE and PCE.

Soil was aspirated (a vacuum extraction method) from soil 18 polluted with TCE and PCZ according to the known method, the initial concentration of TCE was 700 ppm to 900 ppm and that of PCE was 300 ppm to 700 ppm. Polluted air was blown into a treatment tank from a lower part of the treatment tank and irradiated with light to degrade and remove TCE and PCE present in the gaseous state in the air.

Chlorine-containing water (electrolyzed acidic water) was supplied from Oasys Bio Ralf (Asahi Glass Engineering Co., Ltd.) into the treatment tank at 50 ml/min, and the polluted air was jetted into the water at 100 ml/min. The chlorine-containing water was drained from the treatment tank at 50 ml/min to maintain a quantity (volume) of the chlorine-containing water always at 8% to 12% of the treatment tank. A black light fluorescent lamp (Toshiba, FL10BLB, 10 W) was used for light irradiation in the treatment tank. An irradiation energy was about 0.2 mW/cm$^2$ to 0.6 mW/cm$^2$. The concentrations of TEC and PCE in the exhausted gas were measured using a gas chromatograph equipped with an FID detector (trade name: GC-14B, Shimadzu) using a column (DB-624 of J&W Corporation). As a result, the concentrations of TCE and PCE in the exhausted gas were found to be not higher than 2 ppm, indicating that TCE and PCE could be highly degraded and removed using the apparatus of the present invention.

Example 2

The effect of the polluted soil remediation apparatus according to another embodiment of the present invention was confirmed at a field site similar to that in Example 1.

In this example, a solution containing a hypochlorite (hydrochloric acid at 0.006 mol/l, sodium chloride at 0.01 mol/l, and sodium hypochlorite at 0.002 mol/l, pH 2.3) was used in the treatment tank in place of the electrolyzed water as chlorine-containing water. Beside this, experiments were conducted in a manner similar to that for Example 1.

Figure 2:
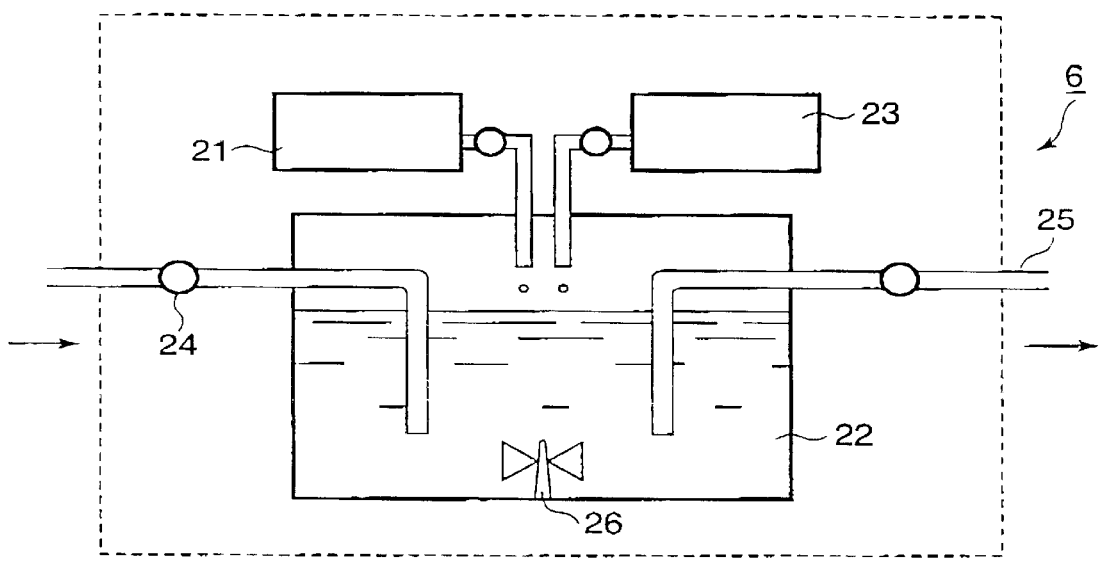
FIG. 2 is a schematic view of chlorine-containing water
generation means used in the present invention.

In other words, in this example, an apparatus as shown in FIG. 2 was used as means for generating chlorine-containing water 6. In the figure, a tank 21 storing the solution containing the hypochlorite supplies a predetermined quantity of the solution to the mixing tank 22. A tank 23 storing a solution containing an acid, hydrochloric acid in this case, supplies a predetermined quantity of the solution to the mixing tank 22. Raw water is supplied from a supply pipe 24 to the mixing tank 22, where the solution containing the hypochlorite, the solution containing hydrochloric acid, and raw water were mixed to produce "chlorine-containing water", i.e. functional water. This water is drained through a pipe 25. 26 denotes stirring means.

The concentrations of TCE and PCE in the exhausted gas were measured using a gas chromatograph equipped with an FID detector (trade name: GC-14B, Shimadzu) using a column (DB-624 of J&W Corporation). As a result, the concentrations of TCE and PCE in the exhausted gas were found to be not higher than 2 ppm, indicating that TCE and PCE could be highly degraded and removed using the apparatus of the present invention.

Example 3

Although air containing pollutants was introduced in chlorine-containing water to mix the chlorine-containing gas and the pollutants in Examples 1 and 2, a gas containing no pollutants was introduced into chlorine-containing water and the generated chlorine gas was mixed with the air containing the pollutants in this example.

FIG. 3 is a schematic view according to the present invention. A shaft 2 was formed in polluted soil 18. A vacuum pump 3 to aspirate air in the shaft 2 was provided on the wall surrounding an opening of the shaft 2 of a polluted soil remediation apparatus 1. In addition, the vacuum pump 3 was connected to a lower part of a treatment tank 5 via a blower 4 to degrade pollutants. That is, the pollutants in the polluted soil 18 were aspirated by the vacuum pump 3 and the air containing the pollutants was blown into the treatment tank 5 through the lower part of the treatment tank by a blower 4.

An apparatus generating chlorine-containing water 6 supplies chlorine-containing water to a chlorine generation tank 12 via a pipe 7. Air is blown into the chorine generation tank 12 from a lower part of the chlorine generation tank 12 by a blower 13. From an air supply port 14, air sent from the blower 13 is supplied into the chlorine generation tank 12. Air is jetted into chlorine-containing water as bubbles to release air containing a chlorine gas into the gas phase part of the chlorine generation tank 12. The chlorine-containing gas is sent to the treatment tank 5 via a pipe 15 The polluted air sent from a gas supply port 8 by the blower 4 is supplied to the treatment tank and mixed with the chlorine-containing gas. The mixture of the pollutants and a chlorine gas is irradiated with light by light irradiation means 9, for which a black light, for example, may be used. 10 denotes a tube exhausting cleaned polluted gas. 11 denotes a tube draining chlorine-containing water that has been used for the treatment. The volume of the chlorine generation tank 12 was set at 20% of the volume of the treatment tank 5.

For this apparatus, the chlorine-containing air and the gas containing pollutants are mixed in the treatment region of the treatment tank, and the gas mixing means is formed by component parts including the pipe 15 or the like necessary for the mixing.

The effect was confirmed using the polluted soil remediation apparatus as shown in FIG. 3 at the field site similar to that in Example 1. In this example, electrolyzed water similar to that used in Example 1 was used as the chlorine-containing water to conduct experiments in a manner similar to that in Example 1.

The concentrations of TCE and PCE in the exhausted gas were measured using a gas chromatograph equipped with an FID detector (trade name: GC-14B, Shimadzu) using a column (DB-624 of J&W Corporation). As a result, the concentrations of TCE and PCE in the exhausted gas were found to be not higher than 2 ppm, indicating that TCE and PCE could be highly degraded and removed using the apparatus of the present invention.

Although the chlorine-containing gas is sent to the treatment tank 5 via the pipe 15 in the configuration of the present invention, the chlorine-containing gas may be supplied between the pump 3 and blower 4 to supply the mixed gas from the blower 4 to the treatment tank 5.

Example 4

Although the pollutants were aspirated from the polluted soil in Examples 1 to 3, a pipe is placed in polluted soil material excavated from the polluted soil to clean polluted soil material.

Figure 4:
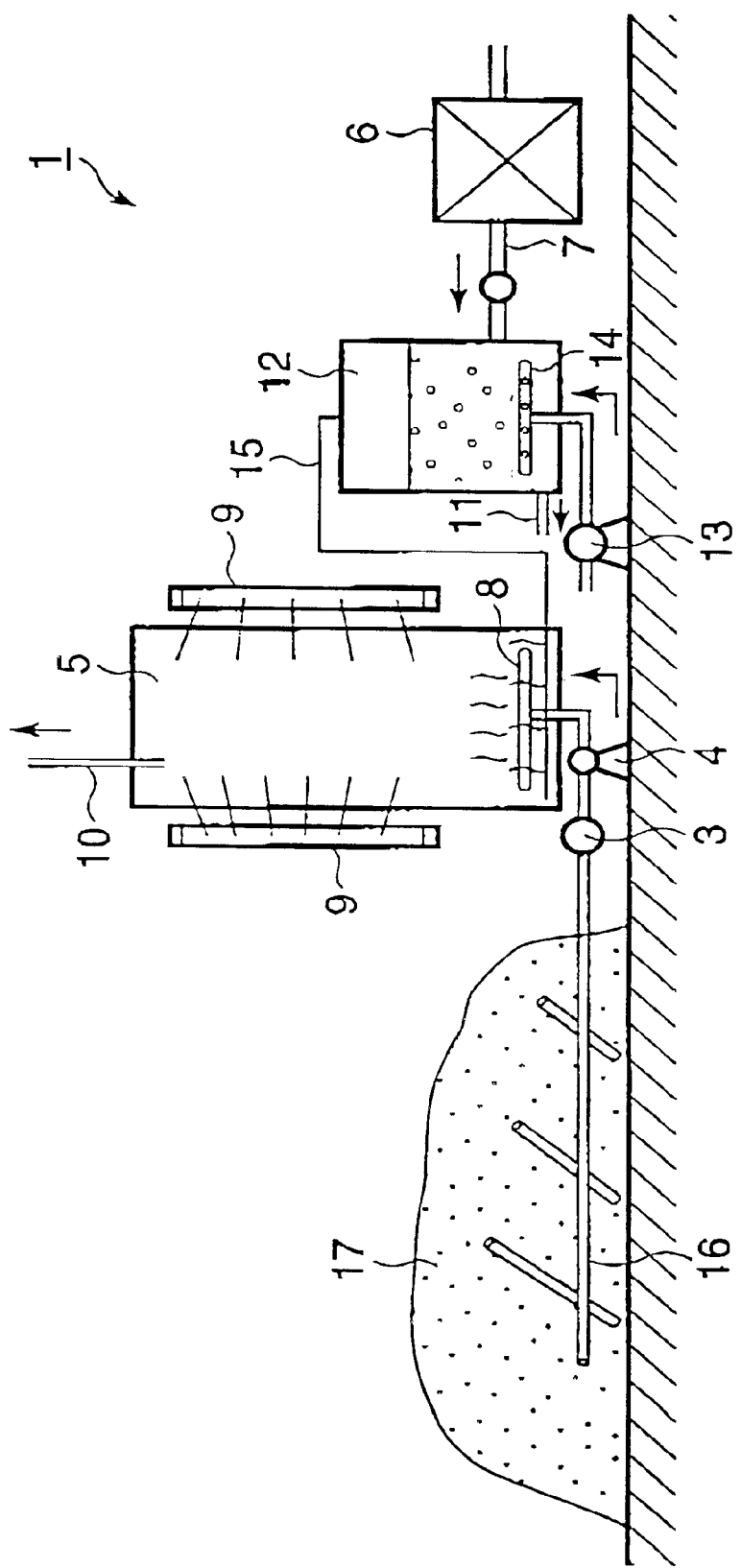
FIG. 4 is a schematic view of a polluted soil remediation
apparatus according to another embodiment of the present
invention.

In FIG. 4 in which 17 denotes excavated polluted soil material, 16 denotes a pipe, and 3 denotes a pump, the pollutants in the polluted soil material are aspirated and sent to a treatment tank by a pump 3 and degraded in the treatment tank.

The polluted soil material 17 polluted with organic chlorinated compounds or the like was cleaned using the apparatus as shown in FIG. 4. The concentrations of the pollutant components of the polluted soil were as follows:
Trichloroethylene concentration: 11.3 mg/kg
Tetrachloroethylene concentration: 8.1 mg/kg
Dichloroniethane concentration: 2.3 mg/kg
1,1,1-Trichloroethane concentration: 8.3 mg/kg Except that the excavated polluted soil material was used, experiments were conducted in a manner similar to that for Example 3, and the concentrations of the pollutants were measured using the similar method. The concentrations of all the pollutants from an exhaust tube 10 were not higher than the detection limits and the concentrations of all the pollutants of the polluted soil material after treatment were not higher than 0.01 mg/kg, confirming that the polluted soil material was cleaned and the pollutants released from the polluted soil material were degraded.

Example 5

The light source of 300 nm to 500 nm was used as the means for light irradiation in Examples 1 to 4, a light source having a peak at 254 nm (bactericidal lamp) was used to clean polluted soil material in this example. Experiments were conducted using an apparatus configuration similar to that for Example 3, except that a light irradiation unit having a bactericidal lamp inserted into a quartz tube was placed in a treatment tank 5 in place of a black light and the treatment was irradiated with UV light. The degradation ability was compared between the case where chlorine-containing air was generated from chlorine-containing water and the case where chlorine-containing gas was not generated and the soil material was mixed only with air. The degradation ability was 2 to 10 times superior when a chlorine gas was added even using the bactericidal lamp.

Example 6

Figure 5:
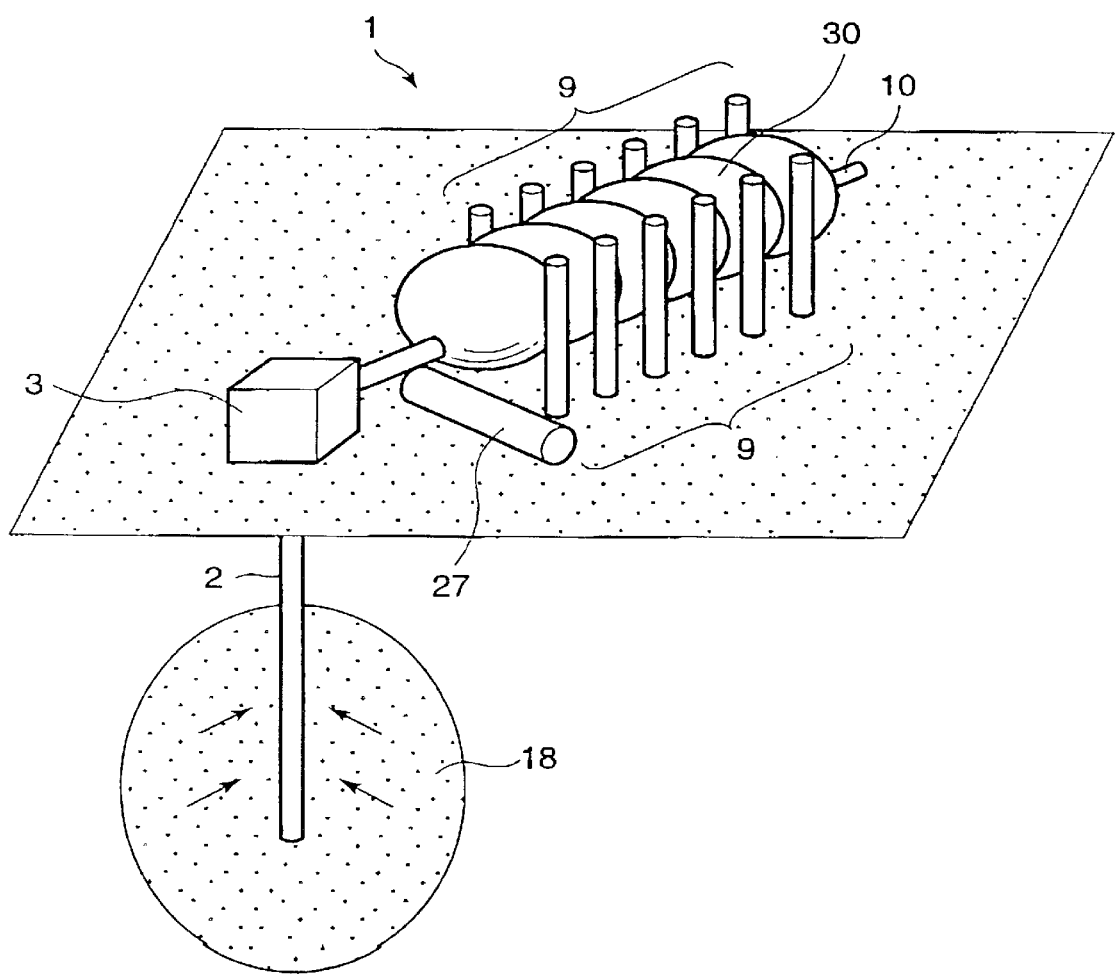
FIG. 5 is a schematic view of a polluted soil remediation
apparatus according to another embodiment of the present
invention.

Fig. 5 is a schematic view of this working example. In the figure, a vertical pit 2 of polluted soil remediation apparatus 1 is provided in polluted soil 18, and a vacuum pump 3 is located in a housing on the opening of the pit. The vacuum pump is connected to bags for the reaction bags 30 through a blower.

Reference numeral 27 denotes a chlorine cylinder as a means of providing chlorine in FIG. 5, which cylinder 27 may be replaced with such a chlorine generation tank 12 as in FIG. 3. Chlorine gas was supplied to bags 30 so that the inside of the bag had a predetermined chlorine concentration. Accordingly, the pollutant in polluted soil 18 is aspirated by vacuum pump 3 and the resulting gas containing the pollutant is mixed with chlorine gas from chlorine cylinder 27 in bags 30. Reference numeral 9 denotes light irradiation means of irradiating the mixture of the pollutant and the chlorine gas with light, as which black lights may be used.

Reference numeral 10 denotes a pipe for discharging the purified gas.

Reaction bags 30 may be bags in any shape, provided the following conditions are fulfilled:
(1) not allowing the gas to pass through the material of the bag;
(2) transmitting light of 300 nm and more or 350 nm or more; and
(3) having a strength enduring the gas stream and pressure. It is desirable that there is no adsorption, but the existence of a slight adsorptive is not a problem.

An aspiration from soil 18 polluted with TCE, PCE and dichloromethane was conducted in a conventional manner (vacuum extraction method). The initial concentrations of TCE, PCE and dichloromethane in the resulting aspirated gas were 30–50 ppm, 100–150 ppm and 30–50 ppm, respectively. Using this aspirated gas, the performance of the polluted soil remediation apparatus as shown in FIG. 5 was checked, wherein a chlorine cylinder was used as the chlorine source, and TEDLAR bags (manufactured by G.L. Science Corp., total volume: 3 m³) were used as the treatment tank (i.e. reaction bags 30 in FIG. 5).

The reaction bags can be folded and stored when being out of use and has a good mobility so that it is possible to install easily at a polluted site where the remediation is to be carried out, in which there is a great difference from a structure having a body made of metal or glass. Setting the light irradiation means system and establishing a pass of the gas are only steps after the installation. The dismantlement of the apparatus after the remediation is easy, too.

The chlorine gas was provided from the chlorine cylinder so as to make the concentration of chlorine amount to 100 ppm by volume. The polluted gas was provided at a rate so as to make the retention time amount to 1 min. The irradiation of the TEDLAR bags with light was carried out from both side of the bags as schematically shown in FIG. 5 by commercially available black lights (FL 40 S BLB manufactured by Toshiba Corp.)

Concentrations of TCE, PCE and dichloromethane in the discharged gas after the treatment were measured with a chromatograph with FID detector (GC-14B manufactured by Shimazu Corp.; column: DB-624 manufactured by J&W corp.) The concentrations of TCE, PCE and dichloromethane could not detected because they have values under the discrimination of the chromatograph, which means that the apparatus of the present invention enables TCE, PCE and dichloromenthane to be extremely degraded and removed.

Figure 6:
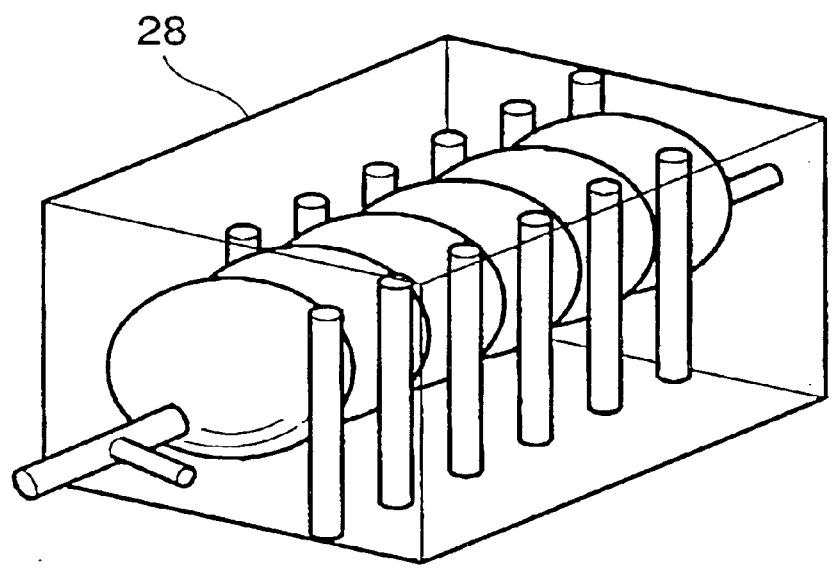
FIG. 6 is a schematic view of a pollution purification
apparatus according to another embodiment of the present
invention.

FIG. 6 shows a constitution wherein a pollution remediation apparatus of the present invention has been covered by a casing 28. Such a constitution is desirable for remedying an outdoor area.

Example 7

Figure 7A:
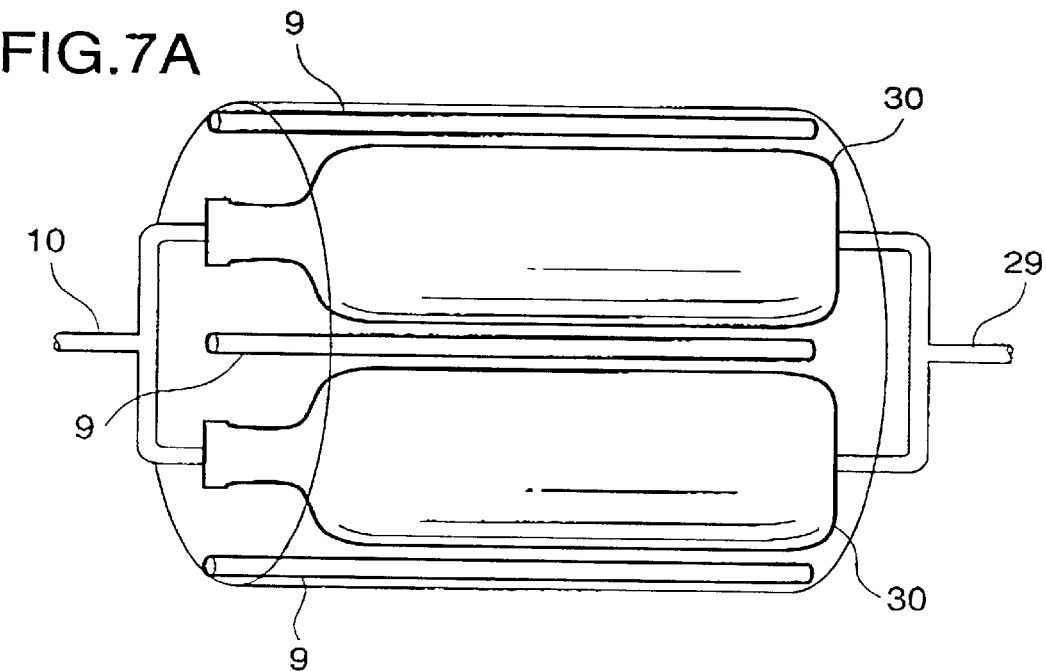
FIGS. 7A and 7B are schematic views of a polluted gas
purification apparatus according to another embodiment of
the present invention.
Figure 7B:
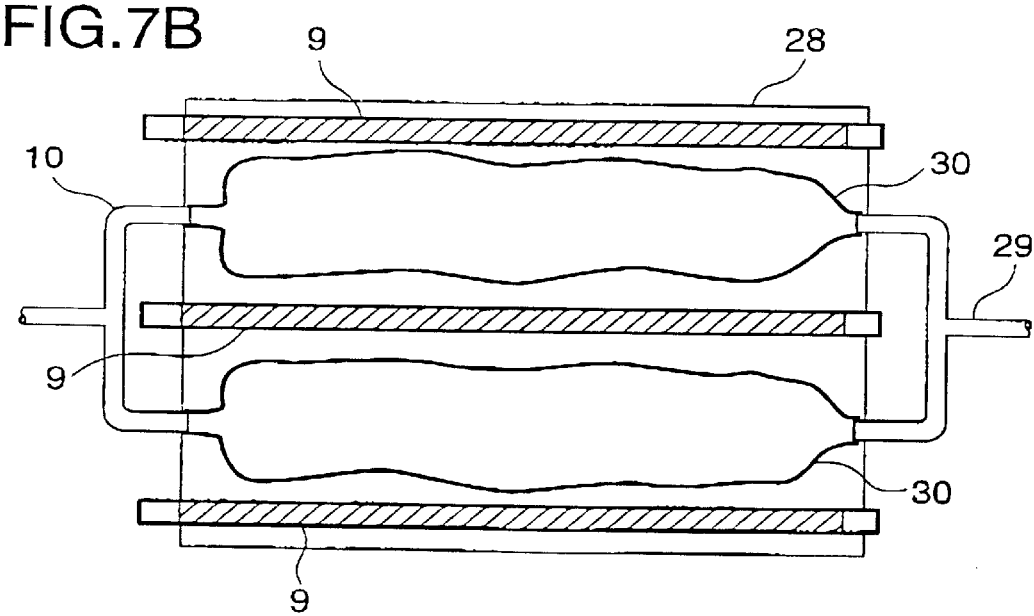

FIGS. 7A and 7B show an embodiment integrating constituents of the constitution with the casing shown in FIG. 6 into a treatment apparatus.

In the embodiment, casing 28 functions as the treatment tank, into which the mixed gas of air containing a pollutant and chlorine gas necessary for degrading the pollutant is introduced through pipe 29. The treatment tank is comprised of reaction bags 30 and light irradiation means 9 as well as casing 28, wherein the bags 30 and the light irradiation means 9 are accommodated in the casing.

The mixed gas introduced into the reaction bags is irradiated with light by the light irradiation means 9, degraded to be cleaned, and discharged through discharging duct 10.

The constitution of carrying out the degrading reaction in the reaction bags makes possible it to prevent the treatment tank (i.e. the casing) and the light irradiation means from establishing contact with the reaction gas, whereby the apparatus can function without being affected by any erosion with the degradation.

The bags used for a long time exceeding the endurance limit can be replaced with new ones, the other portions being maintained

What is claimed is:

1. A polluted soil remediation method comprising the steps of:
    mixing a gas containing a pollutant extracted from a polluted soil and a chorine-containing gas to form a mixed gas;
    irradiating the mixed gas with light to degrade the pollutant contained in the mixed gas.

2. The polluted soil remediation method according to claim 1, wherein a concentration of chlorine gas in said mixed gas is in the range of not less than 5 ppm to not more than 1000 ppm.

3. The polluted soil remediation method according to claim 2, wherein said concentration of chlorine gas in said mixed gas is in the range of not less than 20 ppm to not more than 500 ppm.

4. The polluted soil remediation method according to claim 1, wherein said pollutant is an organic chlorine compound.

5. The polluted soil remediation method according to claim 4, wherein said organic chlorine compound is at least one of selected from the group consisting of chloroethylene, 1,1-dichloroethylene, cis-1,2-dichloroethylene, trans-1,2-dichloroethylene, trichloroethylene, 1,1,1-trichloroethane, tetrachloroethylene, chloromethane, dichloromethane and trichloromethane.

6. The polluted soil remediation method according to claim 1, wherein said extracting is carried out by using a pit provided in said polluted soil and a vacuum pump for extracting said gas containing the pollutant through the pit.

7. The polluted soil remediation method according to claim 1, wherein said chlorine-containing gas is introduced by using a chlorine cylinder.

8. The polluted soil remediation method according to claim 1, wherein said chlorine-containing gas is introduced by a step of generating an air containing chlorine comprising bringing functional water capable of generating the air containing chlorine by being aired into contact with air.

9. The polluted soil remediation method according to claim 8, wherein said step of generating an air containing chlorine further comprises the steps of:
generating said functional water;
providing said functional water to a water tank;
introducing said air into the water tank;
discharging said chlorine-containing air generated by the functional water; and
discharging the functional water used to generate the chlorine-containing air.

10. The polluted soil remediation method according to claim 9, wherein said generating step of said functional water is comprised of the steps of:
providing water containing an electrolyte to a cistern; and
applying a potential to the water containing the electrolyte in the cistern.

11. The polluted soil remediation method according to claim 10, wherein said electrolyte is at least one selected from the group consisting of sodium chloride and potassium chloride.

12. The polluted soil remediation method according to claim 9, wherein said generating step comprises the steps of:
providing an aqueous solution of a hypochlorite to a cistern; and
providing an aqueous solution of an inorganic acid and/or an organic acid to said cistern.

13. The polluted soil remediation method according to claim 12, wherein said hypochlorite is at least one selected from the group consisting of sodium chloride and potassium chloride.

14. The polluted soil remediation method according to claim 12, wherein said aqueous solution of hypochlorite contains an inorganic acid or an organic acid.

15. The polluted soil remediation method according to claim 14, wherein said inorganic acid is at least one selected from the group consisting of hydrochloric acid, hydrofluoric acid, sulfuric acid, phosphoric acid and boric acid; and said organic acid is at least one selected from the group consisting of oxalic acid, acetic acid, formic acid, malic acid and citric acid.

16. The polluted soil remediation method according to claim 8, wherein said step of generating an air containing chlorine further comprises a step of sending said air to a surface of said functional water.

17. The polluted soil remediation method according to claim 8, wherein said functional water is obtained by:
providing a water containing an electrolyte to a cistern; and
applying a potential to the water containing the electrolyte in the cistern with the aid of a pair of electrodes.

18. The polluted soil remediation method according to claim 17, wherein said electrolyte is at least one selected from the group consisting of sodium chloride and potassium chloride.

19. The polluted soil remediation method according to claim 18, wherein said step of generating an air containing chlorine further comprises a step of sending said air to a surface of said functional water.

20. The polluted soil remediation method according to claim 19, wherein said functional water has been prepared at an anode side of said pair of electrodes; and said step of generating an air containing chlorine further comprises a step of introducing said air in the vicinity of the anode side in said cistern.

21. The polluted soil remediation method according to claim 17, wherein said step of generating an air containing chlorine further comprises a step of aerating said functional water with said air.

22. The polluted soil remediation method according to claim 21, wherein said functional water has been prepared at an anode side of said pair of electrodes; and said step of generating an air containing chlorine further comprises a step of introducing said air in the vicinity of the anode side in said cistern.

23. The polluted soil remediation method according to claim 8, wherein said step of generating an air containing chlorine further comprises a step of bringing small droplets of said functional water into contact with said air.

24. The polluted soil remediation method according to claim 23, wherein said step of bringing small droplets of said functional water into contact with air is carried out by ejecting the functional water from a nozzle.

25. The polluted soil remediation method according to claim 8, wherein said step of generating an air containing chlorine further comprises a step of aerating said functional water with said air.

26. The polluted soil remediation method according to claim 25, wherein said step of aerating said functional water with air is carried out by using a bubbler.

27. The polluted soil remediation method according to claim 8, wherein said air does not include any substance to be degraded provided from outside.

28. The polluted soil remediation method according to claim 27, wherein said functional water has properties of a hydrogen ion exponent (pH) of 1 to 4, and a dissolved chlorine concentration of 50 to 3000 mg/l.

29. The polluted soil remediation method according to claim 28, wherein said functional water has properties of a hydrogen ion exponent (pH) of 2 to 3, and a dissolved chlorine concentration of 100 to 1500 mg/l.

30. The polluted soil remediation method according to claim 8, wherein said step of generating an air containing chlorine uses said gas containing the pollutant which has been extracted from said polluted soil.

31. The polluted soil remediation method according to claim 30, wherein said functional water has properties of a hydrogen ion exponent (pH) of 1 to 4, and a is dissolved chlorine concentration of 5 to 300 mg/l.

32. The polluted soil remediation method according to claim 8, wherein said functional water has properties of a hydrogen ion exponent (pH) of 4 to 10, and a dissolved chlorine concentration of 30 to 2000 mg/l.

33. The polluted soil remediation method according to claim 8, which includes a step of irradiating said functional water used for generating said chlorine-containing air and discharged with light.

34. The polluted soil remediation method according to claim 8, wherein a chlorine-generating region in which said step of generating an air containing chlorine is carried out is one with a treatment region and is located in a lower portion of the treatment tank; and a volume of said functional water accounts for 5 to 30% of a capacity of said treatment tank.

35. The polluted soil remediation method according to claim 1, wherein said treatment tank is in the shape of a bag having a shape and capacity that are variable.

36. The polluted soil remediation method according to claim 35, wherein said bag-shaped treatment tank has an accordion-fold structure.

37. The polluted soil remediation method according to claim 36, wherein a case covering said bag-shaped treatment tank is used.

38. The polluted soil remediation method according to claim 37, wherein said irradiating step is carried out by a light irradiation means located in a region inside said case and outside said bag-shaped treatment tank.

39. The polluted soil remediation method according to claim 1, further comprising a step of sending at least one portion of said gas containing the pollutant extracted from said polluted soil directly to said treatment tank.

40. The polluted soil remediation method according to claim 1, wherein chlorine radical is formed from chlorine contained in said mixed gas in said irradiating step.

41. The polluted soil remediation method according to any one of claim 1, wherein said light with which said mixed gas is irradiated in said irradiating step comprises a light within a range of wavelengths of 300 to 500 nm.

42. The polluted soil remediation method according to claim 41, wherein said light comprises a light within a range of wavelengths of 350 to 450 nm.

43. The polluted soil remediation method according to claim 1, wherein an irradiance of said light with which said mixed gas is irradiated is in the range of 10 $\mu W/cm^2$ to 10 $mW/cm^2$.

44. The polluted soil remediation method according to claim 43, wherein said irradiance is in the range of 50 $\mu W/cm^2$ to 5 $mW/cm^2$.

45. A pollutant-degrading method in which a mixed gas of a gas containing a pollutant degradable with light irradiation in the presence of chlorine and a chlorine-containing gas is irradiated with light to degrade the pollutant, which comprises the steps of:

mixing the gas containing the pollutant and the chorine-containing gas to form the mixed gas;

irradiating the mixed gas introduced in a treatment region of a bag-shaped treatment tank having a shape and a capacity that are variable with light to degrade the pollutant contained in the mixed gas; and exhausting the irradiation-treated mixed gas from the treatment region.

46. The pollutant-degrading method according to claim 45, wherein said bag-shaped treatment tank has an accordion-fold structure.

47. The pollutant-degrading method according to claim 45, wherein a case covering said bag-shaped treatment tank is used.

48. The pollutant-degrading method according to claim 47, wherein said irradiating step is carried out by a light irradiation means located in a region inside said case and outside said bag-shaped treatment tank.

49. The polluted-degrading method according to claim 45, wherein said gas containing said pollutant is at least one selected from the group consisting of a gas aspirated from a polluted soil, a polluted exhaust gas, a polluted gas desorbed from an activated carbon and a polluted gas originating from an aeration of a polluted water.

* * * * *

UNITED STATES PATENT AND TRADEMARK OFFICE
CERTIFICATE OF CORRECTION

PATENT NO. : 6,538,170 B2
DATED : March 25, 2003
INVENTOR(S) : Kinya Kato et al.

It is certified that error appears in the above-identified patent and that said Letters Patent is hereby corrected as shown below:

Title page,
Item [56], OTHER PUBLICATIONS,
"K.L. Müller et al.", "Phtochemische" should read -- Photochemische --.

Column 2,
Line 5, "introduced; and" should read -- introduced --;
Line 14, "Means" should read -- A means --;
Line 23, "Means" should read -- A means --; and
Line 56, "bring" should read -- bringing --.

Column 3,
Line 30, "a light" should read -- ¶a light --; and
Line 53, "inventions," should read -- invention, --.

Column 4,
Line 52, "present" should read -- present invention --.

Column 5,
Line 9, "irradiates" should read -- irradiate --; and
Line 35, "contain" should read -- contains --.

Column 6,
Line 4, "in" (second occurrence) should be deleted;
Line 22, "(, ie." should read -- (i.e., --; and
Line 37, "electrolyzed," should read -- being electrolyzed, --.

Column 7,
Line 7, "tradename," should read -- trade name, --;
Line 58, "In" should read -- For --; and
Line 67, "that" should be deleted.

Column 8,
Line 13, "does" should read -- do --;
Line 48, "passing" should read -- pass --.

UNITED STATES PATENT AND TRADEMARK OFFICE
CERTIFICATE OF CORRECTION

PATENT NO.    : 6,538,170 B2
DATED         : March 25, 2003
INVENTOR(S)   : Kinya Kato et al.

It is certified that error appears in the above-identified patent and that said Letters Patent is hereby corrected as shown below:

Column 9,
Line 13, "is" should read -- are --; and
Line 28, "are" should read -- is --.

Column 11,
Line 66, "pipe 15" should read -- pipe 15. --.

Column 13,
Line 62, "only" should read -- the only --.

Column 14,
Line 10, "detected" should read -- be detected --;
Line 35, "makes possible it" should read -- makes it possible --;
Line 41, "the other portions being" should read -- while other portions are --;
Line 42, "maintained" should read -- maintained. --;
Line 47, "chorine-containing" should read -- chlorine-containing --; and
Line 48, "gas;" should read -- gas; and --.

Column 16,
Line 51, "is" should be deleted.

Column 17,
Line 22, "any one of" should be deleted.

Signed and Sealed this

Twenty-third Day of September, 2003

JAMES E. ROGAN
*Director of the United States Patent and Trademark Office*